United States Patent [19]

Kuo

[11] Patent Number: 5,203,084
[45] Date of Patent: Apr. 20, 1993

[54] STRUCTURE FOR SCISSORS WITH PINCER-CLIP

[75] Inventor: Long-Far Kuo, Taipei, Taiwan

[73] Assignees: Pei-Ken Lui; Chi-Chang Yang, both of Taiwan

[21] Appl. No.: 854,575

[22] Filed: Mar. 20, 1992

[51] Int. Cl.⁵ ............................................ B26B 13/14
[52] U.S. Cl. ........................................ 30/135; 30/134; 30/260; 30/261
[58] Field of Search ................. 30/134, 135, 254, 260, 30/261, 262

[56] References Cited

U.S. PATENT DOCUMENTS

| | | | |
|---|---|---|---|
| 835,791 | 11/1906 | Kelly | 30/135 |
| 1,009,203 | 11/1911 | Webster | 30/134 |
| 1,493,539 | 5/1924 | Hess | 30/135 |
| 2,046,642 | 7/1936 | Lynch | 30/261 |
| 2,369,271 | 2/1945 | Arnold | 30/260 |
| 3,688,405 | 9/1972 | Dutra, Jr. | 30/135 |
| 4,117,592 | 10/1978 | Mori et al. | 30/135 |

Primary Examiner—Frank T. Yost
Assistant Examiner—Hwei-Siu Payer
Attorney, Agent, or Firm—Harrison & Egbert

[57] ABSTRACT

An improved structure for a pair of scissors with pincer-clip, especially for the control of the scissors' opening angle when it's opened, and the locking of the scissors when it's closed. This pair of scissors with pincer-clip can achieve its function by moving on one side. The limitation of its opening is achieved by a O-shape buckle that connects to the spring coils on one side and a long groove of the handle on the other side. Following the opening of the pair of scissors, the O-shape buckle moves up and down in the long groove, thus controlling the opening angle of the pair of scissors by the distance between the spring coils and the pivot, and locking the pair of scissors when it's closed.

7 Claims, 4 Drawing Sheets

STRUCTURE FOR SCISSORS WITH PINCER-CLIP

BACKGROUND OF THE INVENTION

Pruning scissors used to prune flowers and plants or to pick fruits are available in many designs today. One of the pruning scissors has multiple function of cutting and gripping the stem of a fruit or a flower at the same time. Because of such a function, this type of pruning scissors always have a pair of bulky and wide tongs to press and grip the stems, and the pair of scissors is heavy and bulky as a result.

PRIOR ART OF THE INVENTION

To overcome this defect, the inventor of this application developed a pair of scissors with very few parts and a thinnest pincer-clip structure for the user to cut and clip stems, fruits and flowers conveniently. To make the pair of scissors more perfect in its function, the inventor continues to develop an affiliated structure that limits the opening of the scissor blades and locks the scissor blades in fixed position, making this type of scissors more convenient in operation and occupy less space when it's folded for storage.

FIELD OF THE INVENTION

The main characteristics of this invention is that a long groove is made on the inside edge of one handle, and an O-shape buckle is used to fasten with the long groove by one of its side, and to connect with the center of the spring coils by the other side. The change of the distance between the spring coils and the long groove when the pair of scissors is opened or closed will limit the opening angle of the pair of scissors, and the pair of scissors can be locked when it is closed.

The secondary purpose of this invention is to explain that the pair of scissors with pincer-clip submitted can move freely on the clip board, but the other side is connected with the cutting blade to achieve the function of holding the stem of a flower or fruit after the stem is cut.

SUMMARY OF THE INVENTION

The special feature of this invention is the use of a simple structure—an O-shape buckle and a long groove (which can be molded on the handle) to achieve the limitation of the scissors' opening angle and the locking of the pair of scissors when it is closed. The structure is simple and low cost for processing and assembly. The other special feature of this invention is that the fore end of one of the handles forms one of the clip boards to match the counter mobile clip board and forms a pincer-clip of the scissors.

BRIEF DESCRIPTION OF THE DRAWINGS

The following drawings are attached to present this invention clearly for a better understanding of this invention.

NOMENCLATURE

| | | | |
|---|---|---|---|
| (1) | Handle A | (11) | Wedge |
| (12) | Groove | (13) | Axle Hole |
| (14) | Indentation | (2) | Handle B |
| (21) | Groove | (22) | Protruding Ear |
| (23) | Long Groove | (231) | Top of Groove |
| (232) | Hook | (3) | Blade A |
| (31) | Cutting Blade | (32) | Handle |
| (33) | Axle Hole | (34) | Pin Hole |
| (35,36) | Pegs | (4) | Blade B |
| (41) | Cutting Blade | (42) | Handle |
| (43) | Axle Hole | (44) | Tip Hole |
| (5) | Clip Board | (51) | Gripping Surface |
| (52) | Handle | (53) | Axle Hole |
| (531,532) | Edges of Hole | (54) | Pin Hole |
| (55,56) | Pegs | (6) | Pivot |
| (61) | Spring Washer | (7) | Spring |
| (71) | Spring Coils | (7,73) | Hooks |
| (8) | O-shape Buckle | (9,10) | Pin |
| (S) | Object | | |

DETAILED DESCRIPTION OF THE PREFERRED EMBODIMENT

Figure 1:
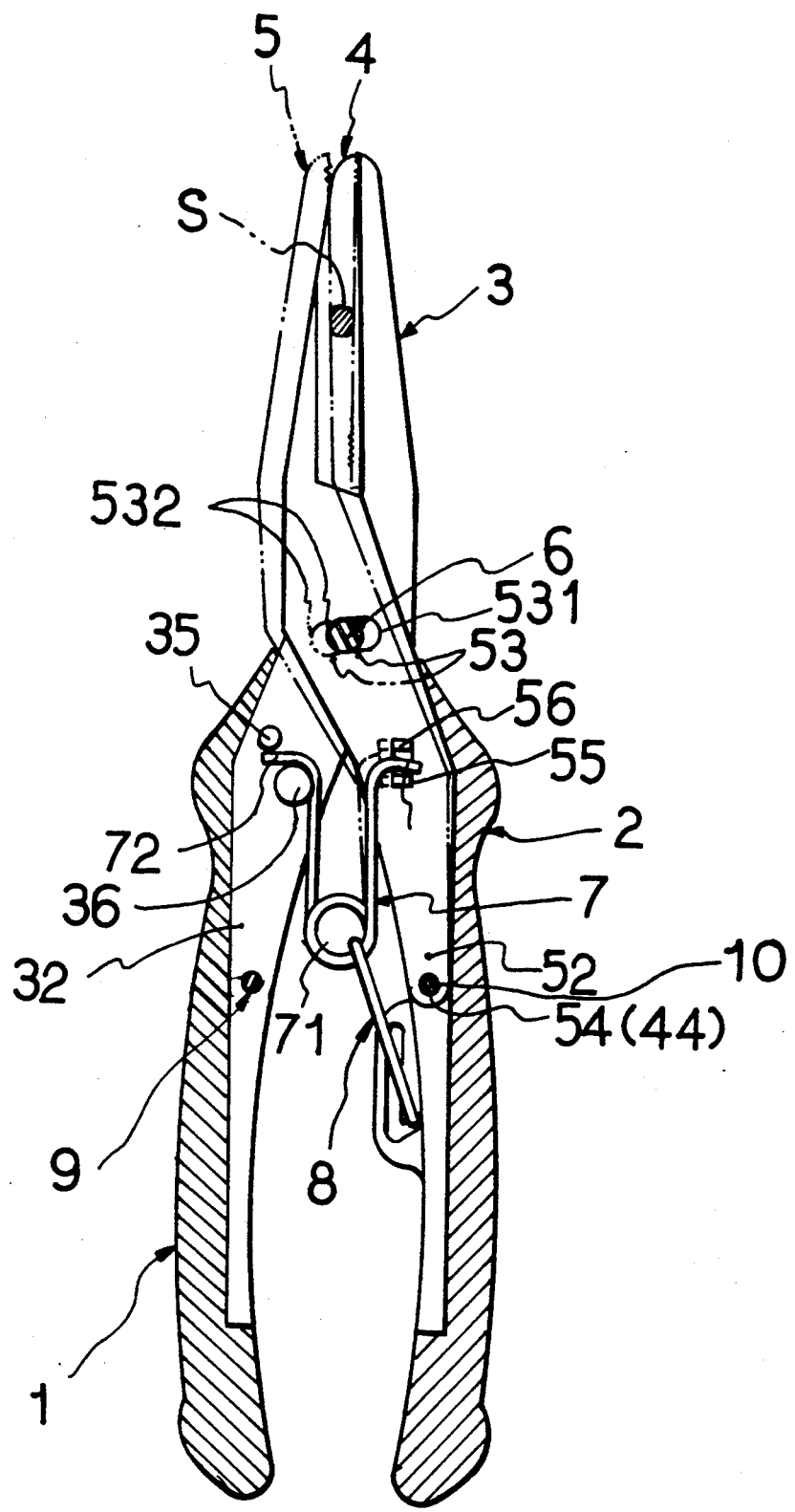
FIG. 1 is the analytical drawing of the pair of scissors holding a stem.
Figure 3:
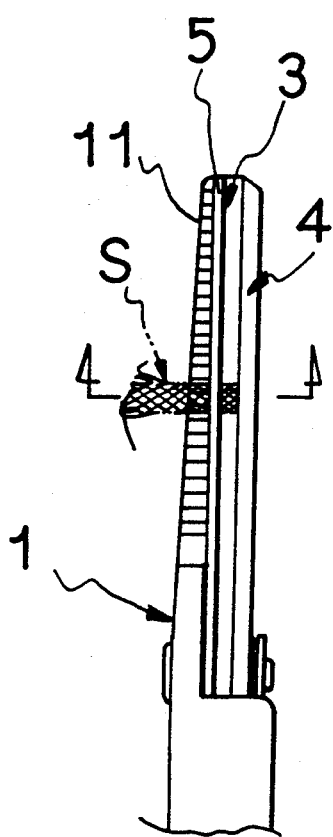
FIG. 3 shows the side view of this invention.
Figure 4:
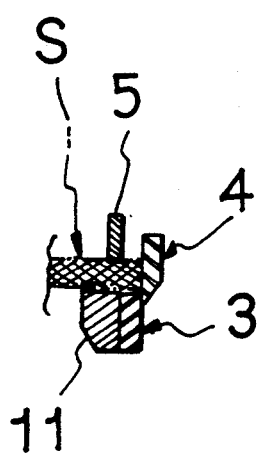
FIG. 4 is a cross-sectional drawing for A-A' for FIG. 3 of this invention.
Figure 5:
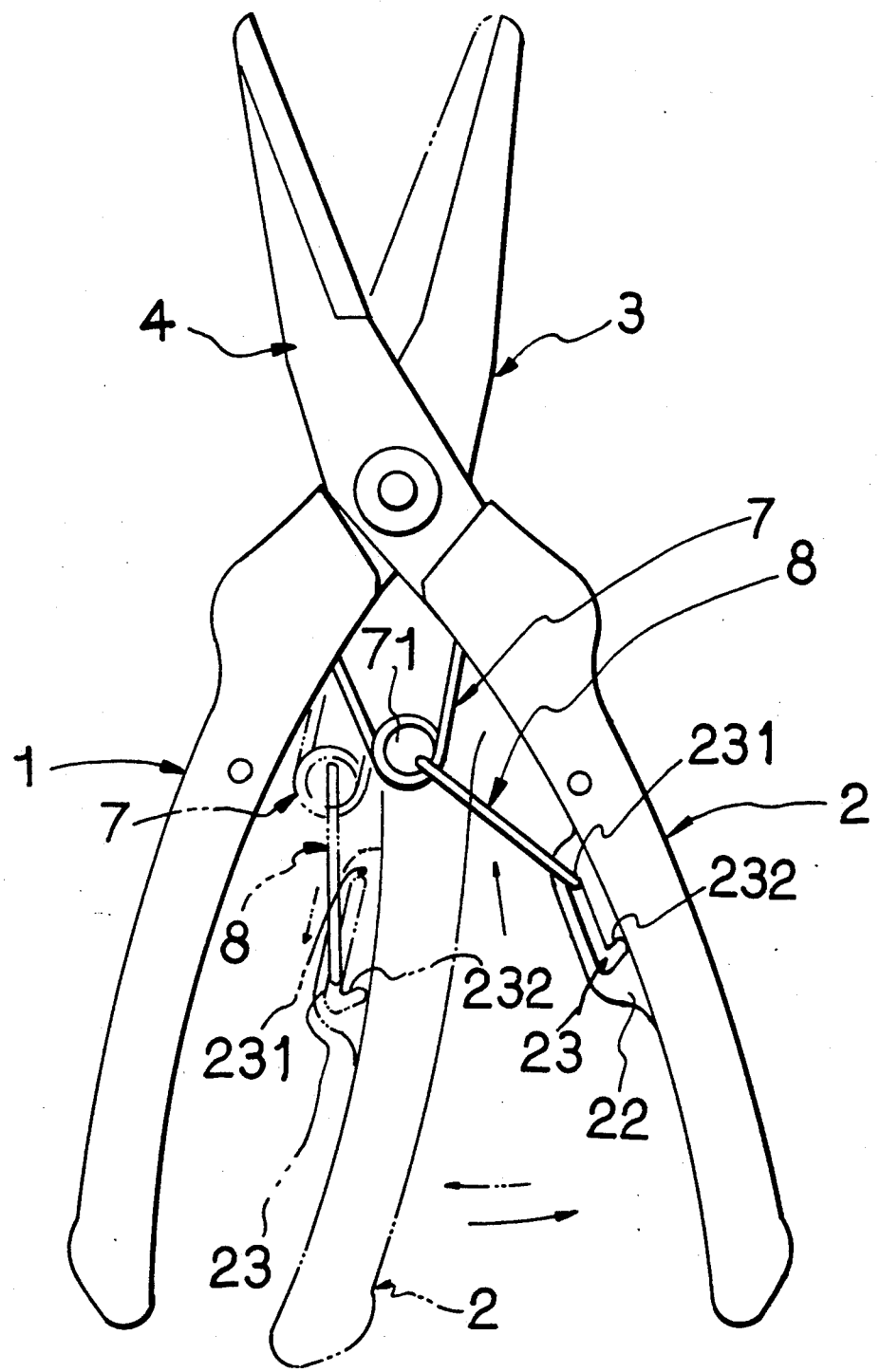
FIG. 5 shows the structure of this invention when it is opened.
Figure 6:
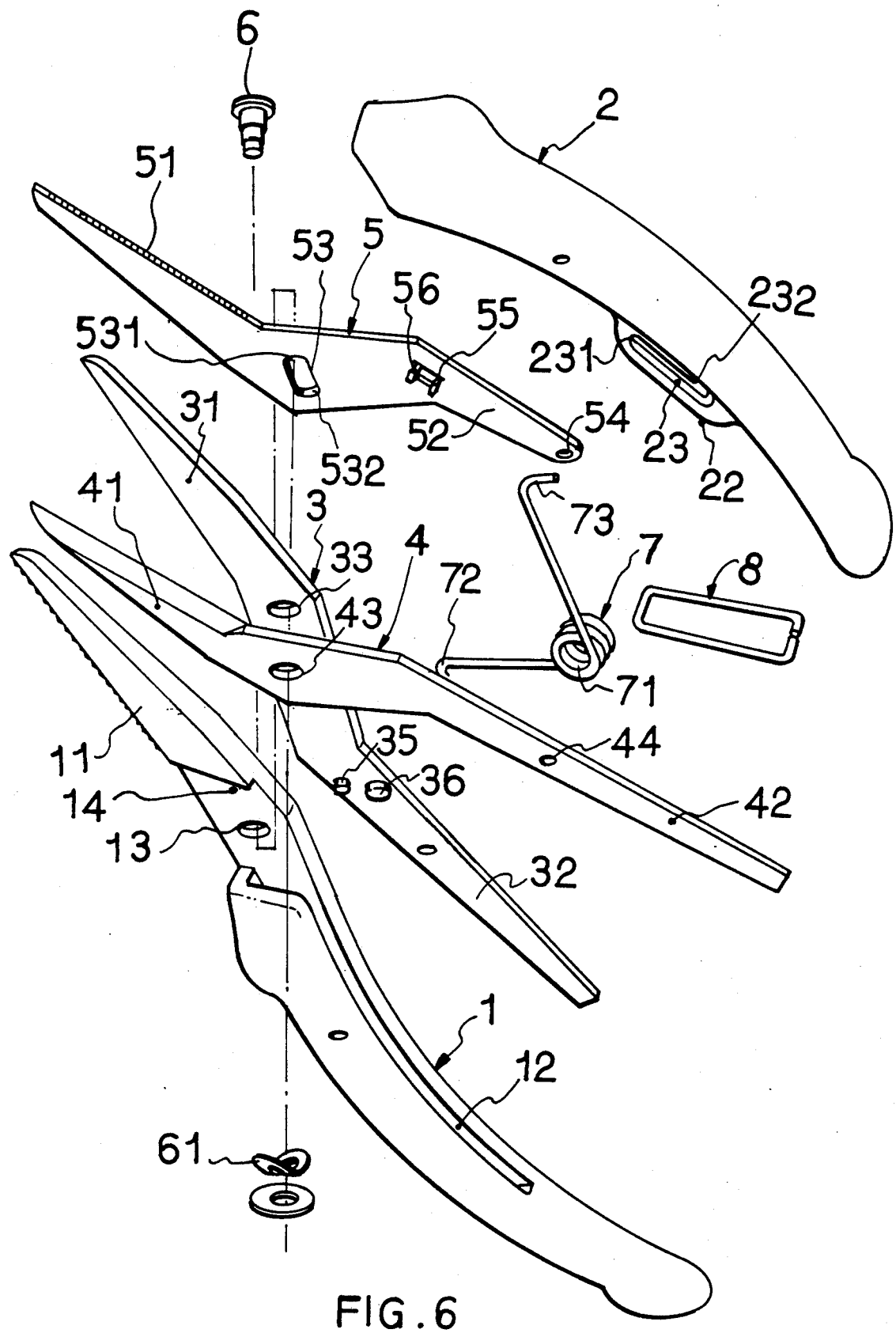
FIG. 6 is an explosion drawing of this invention.

The structure of this invention is illustrated by FIGS. 1, 5 and 6. When the pair of scissors is looked from the front, its blade (3) and blade (4) are crossed on their necks and joined by a pivot (6), and the handles (32 and 42) of the two blades are inserted into the grooves (12) of handles (1 and 2), and affixed by pins (9 and 10). The end of handle (1) extends with a cutting blade (31) to form a wedge (11). Axle holes (13 and 33) are made on handle (1) and the cutting blade (31), and an indentation (14) is made between them to accommodate a clip board (5) that has its handle (52) stuck into a groove of handle (2) and its end has a pin hole (54) to connect with a pin (9). The axle hole (53) in the middle of the clip board (5) is a long ellipse hole mounted with the pivot (6). The handle (52) of the clip board (5) has a pair of protruding pegs (55,56), and the handle (32) of the opposite blade (3) also has a pair of pegs (35,36). These two pairs of pegs hold two hooks (72 and 73) of a spring (7) respectively.

When the pair of scissors is cutting an object (S), the cutting blades (31 and 41) of blades (3 and 4) cut off the object (S) completely, but the gripping surface (51) of the clip board (5) opens and grips the object (S), as shown by FIG. 1. The main reason for this result is that the clipboard (5) is pivotable at the pin hole (54) about the pin (9), but the axle hole (53) connecting the clip board (5) to the pivot (6) is elliptical in shape, and the hooks (72 and 73) of the spring (7) are stuck on the pegs (35,36) of blade (3) and the pegs (55,56) of the clip board (5). When the pair of scissors is not cutting or holding the object (S), the elliptical axle hole (53) has one edge (532) in resilient contact with the pivot (6). The spring (7) urges the edge (532) into contact with the pivot (6). In this position, the clipboard (5) and the blade (4) will move in unison since there is no resistance acting against the gripping surface (51) of the clipboard (5).

Figure 2:
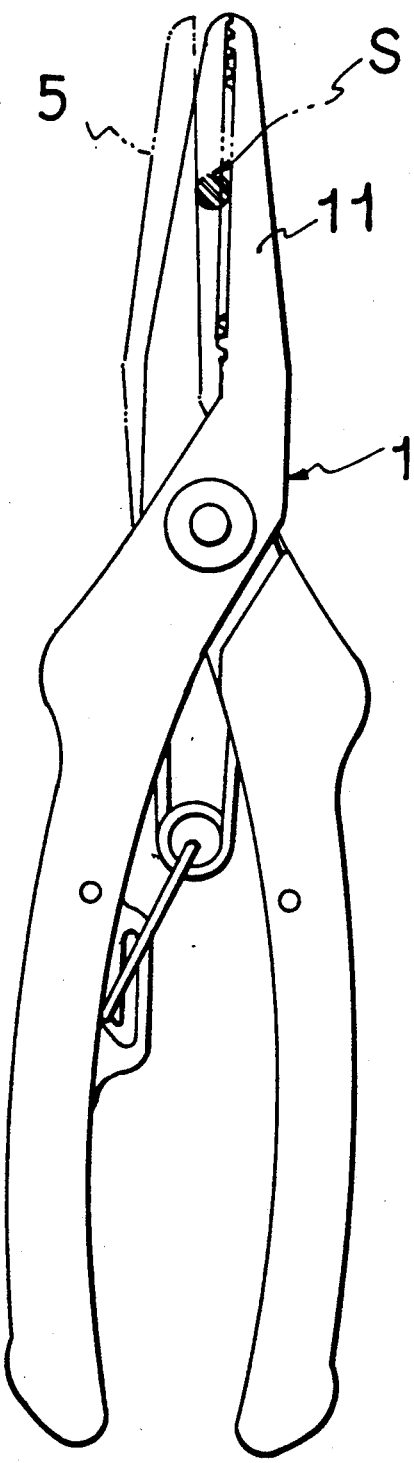
FIG. 2 is the analytical drawing for the back of the pair of scissors.

On the other hand, when the pair of scissors is cutting the object (S), the blades (3 and 4) will cut the object (S). The clipboard (5), however, will continue to grip the object (S) since the gripping surface (51) will be in resilient contact with a surface of the object (S) behind the blades (3 and 4). The gripping surface (51) of clipboard (5) and the wedge (11) of handle (1) act in concert to grip the object (S). The resilient relationship between the gripping surface (51) and the object (S) causes the pivot (6) to move within elliptical axle hole (53) toward the other side (531). As such, the object (S) will be gripped between the wedge (11) and gripping surface (51) during and after the cutting action carried out by blades (3) and (4). As can be seen in FIGS. 1 and 2, the clipboard (5), as illustrated in broken line fashion, is displaced from its position in alignment with blade (4). The amount of displacement is generally dependent on the diameter of the object (S).

As for the structure to limit the opening of the pair of scissors, let us use FIG. 1 for explanation. Handle (handle (1) can also be used) has a protruding ear (22) that has a long groove (23) forming a hook (232) at its end. The spring (7) mentioned above is a torsion spring with spring coils (71) in the middle and two hooks (72,73) formed by its two ends. One side of a O-shape buckle (8) is connected to the center of the spring coils (71), and the other side is fastened in the long groove (23). When the pair of scissors is closed, the O-shape buckle (8) can be stuck by the hook (232) of the long groove (23), and the pair of scissors is folded like FIG. 2. As shown by FIG. 5, when the O-shape buckle (8) is stretched away from the hook (232), the other side of it can move freely in the long groove (23). When the pair of scissors is opened, two ends of the spring (7) stretch out, making the spring coils (71) to move towards the pivot (6) and the O-shape buckle (8) is raised. When the O-shape buckle (8) is stuck at the top of the groove (231), the movement of the spring coils (71) is stopped, and the opening of the scissors is restricted.

When the pair of scissors is doing the cutting, the bottom of its O-shape buckle (8) often can't touch the hook (232) because the internal diameter of the spring coils (71) is often much bigger than the diameter of the O-shape buckle (8). As a result, the downward movement of the O-shape buckle (8) in action is shown by FIG. 1. By the use of O-shape buckle (8) and the long groove (23) on the handle, the opening and closing of the pair of scissors are effectively controlled.

What is claimed as now is as following:

1. A pair of scissors with a pincer-clip comprising:
   a pair of blades;
   a pair of handles having grooves formed therein, one of said handles having a wedge formed at one end thereof, said pair of blades mounted in said grooves of said pair of handles, said pair of blades and said one of said handles having a common axle for pivoting thereabout, each of said pair of blades having a cutting blade at one end and a handle member at another end, said handles receiving said handle members, said common axle positioned between said cutting blade and said handle member;
   a clipboard having a handle portion at one end and a gripping surface at the other end, said handle portion received by said another of said handles, said clipboard having an extended axle hole pivotable about said common axle; and
   a spring having one end connected to one of said pair of blades, said spring having the other end connected to said clipboard, said spring for urging said pair of handles apart, one of said pair of blades having a peg affixed thereto, said peg for receiving one end of said springs.

2. The pair of scissors of claim 1, said one of said handles having a flat indentation formed between said wedge and said grooves, said flat indentation having said axle received therein, one of said pair of blades extending within said flat indentation.

3. The pair of scissors of claim 1, said axle hole of said clipboard being an elliptical axle hole slidably pivotably connected to said common axle.

4. A pair of scissors with a pincer-clip comprising:
   a pair of blades;
   a pair of handles having grooves formed therein, one of said handles having a wedge formed at one end thereof, said pair of blades mounted in said grooves of said pair of handles, said pair of blades and said one of said handles having a common axle for pivoting thereabout;
   a clipboard having a handle portion at one end and a gripping surface at the other end, said handle portion received by said another of said handles, said clipboard having an extended axle hole pivotable about said common axle;
   a spring having one end connected to one of said pair of blades, said spring having the other end connected to said clipboard, said spring for urging said pair of handles apart, the other one of said handles having a receptacle positioned adjacent said groove, said receptacle receiving a buckle connected to said spring.

5. The pair of scissors of claim 4, said receptacle having a longitudinal groove formed therein, said groove having a hook formed at one end.

6. The pair of scissors of claim 5, said buckle having a generally O-shaped configuration, said buckle in engagement with said spring at one end, said buckle slidably received by said longitudinal groove at another end.

7. The pair of scissors of claim 4, said spring being a torsional spring having one end connected to one of said blades, said torsional spring having the other end connected to said clipboard, said torsional spring having a coil formed therein, said buckle extending through said coil.

* * * * *